US007210238B2

(12) United States Patent
Nicosia

(10) Patent No.: US 7,210,238 B2

(45) Date of Patent: May 1, 2007

(54) HAIR AND FIBER STACKER

(76) Inventor: John Nicosia, 13003 Sweetbriar Ct., Auburn, CA (US) 95603-4147

( * ) Notice: Subject to any disclaimer, the term of this patent is extended or adjusted under 35 U.S.C. 154(b) by 0 days.

(21) Appl. No.: 11/303,721

(22) Filed: Dec. 15, 2005

(65) Prior Publication Data

US 2006/0130298 A1 Jun. 22, 2006

Related U.S. Application Data

(60) Provisional application No. 60/637,349, filed on Dec. 17, 2004.

(51) Int. Cl.
*A01K 97/26* (2006.01)

(52) U.S. Cl. ............................ 33/501; 33/533; 33/549

(58) Field of Classification Search .................. 33/501, 33/529, 533, 549, 573, 613, 645, 1 BB, 512, 33/562; 43/1
See application file for complete search history.

(56) References Cited

U.S. PATENT DOCUMENTS 2,326,447 A * 8/1943 Enderson ..................... 33/529
5,619,818 A * 4/1997 Frederiksen ............ 269/254 R
5,657,572 A * 8/1997 Little .............................. 43/1
6,681,779 B2 * 1/2004 Stachowski ................. 132/279
6,904,694 B2 * 6/2005 Launius, Jr. ................. 33/562

FOREIGN PATENT DOCUMENTS

JP 2005152377 A * 6/2005

* cited by examiner

*Primary Examiner*—R. Alexander Smith
(74) *Attorney, Agent, or Firm*—Courtney Staniford & Gregory LLP

(57) ABSTRACT

A fiber stacking or aligning apparatus is described. In an embodiment, the apparatus includes a first component and a second component. The first component is configured to permit the introduction of a plurality of fibers into an opening that defines a through hole through the first component. The second component is rotatably coupled to the first component, wherein the second component is configured to permit the introduction of the plurality of fibers that have passed through the through hole into an area in the second component that includes an alignment surface which limits the travel of the plurality of fibers so as to align the plurality of fibers, wherein the second component is further configured to be rotated away from the aligned plurality of fibers to expose the aligned plurality of fibers without disturbing them.

18 Claims, 6 Drawing Sheets

HAIR AND FIBER STACKER

RELATED APPLICATIONS

This application claims the benefit of U.S. Provisional Patent Application No. 60/637,349, filed Dec. 17, 2004, which is hereby incorporated by reference in its entirety.

TECHNICAL FIELD

The disclosed embodiments relate to devices and methods for arranging fibers and fiber-like materials for manipulation in a manufacturing process.

BACKGROUND OF THE DISCLOSURE

Fine fibers or fiber-like materials, such as hairs, are used as components in many assemblies, including fishing flies for example. Fine fibers are also used to create artworks or to embellish fabric. In order to arrange the fine fibers for attachment to a fishing fly or fabric, etc., it is often necessary to arrange the fibers. For example, in many types of fishing flies, groups of animal hairs are arranged for attachment to a fishing hook. The hairs might be intended to look like an insect wing, for example. In order to look and behave properly, the hairs should be arranged in a bunch with all of the roots at one end, and all of the tips aligned. The bunch of hairs is then attached to the fishing hook by tying the root end of the bunch to the hook. The bunch can be tied so that the aligned hair tips fan out on one side of the hook (to look like a wing), or arranged to fan out all around the hook, etc.

Convention hair stackers exist for arranging bunches of hairs such that the tips are all aligned and the root end can be grasped to tie the bunch to a hook. Conventional hair stackers have significant disadvantages, however. For example, conventional hair stackers require the bunch of hairs to be shifted from one hand to the other during the process of extracting the bunch from the stacker, which takes time and usually causes the bunch to become disturbed. Another disadvantage is that the alignment of the hair tips cannot be observed unless one of the two independent parts of the conventional hair stacker is removed to visually check the alignment. This also takes time and causes disturbance of the bunch. Yet another disadvantage is that in the process of removing one of the two independent parts of the conventional stacker to shift the bunch of hairs from hand to hand in preparation for tying the bunch, one part of the conventional hair stacker usually must be set down and may become lost.

DETAILED DESCRIPTION

Embodiments of the invention include a fiber or hair stacker that overcomes the disadvantages of the conventional hair stacker and is easier and faster to use than the conventional hair stacker.

The embodiment of the figures as described herein is one example of the invention, and various modifications, including size variations for example, are within the scope of the invention. As used herein, the terms "hair" and "fiber" are used interchangeably, but in general the embodiments described are suitable for stacking or aligning any group of substantially hair shaped objects that have small diameters in proportion to their lengths.

FIGS. 1–9 are diagrams that show various views of a hair stacker apparatus 100 according to an embodiment. FIGS. 1–4 show the hair stacker apparatus 100 in a closed position. FIGS. 5–9 show the hair stacker apparatus 100 in an open position.

Figure 1:
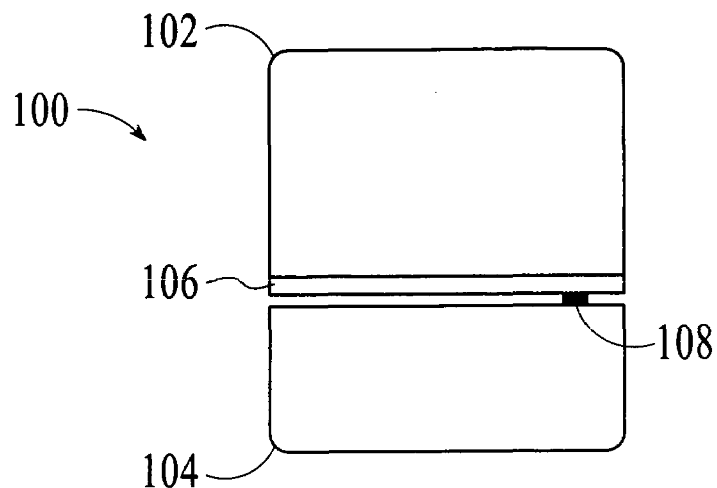
FIGS. 1–9 are diagrams of a fiber stacker apparatus according to an embodiment.
Figure 3:
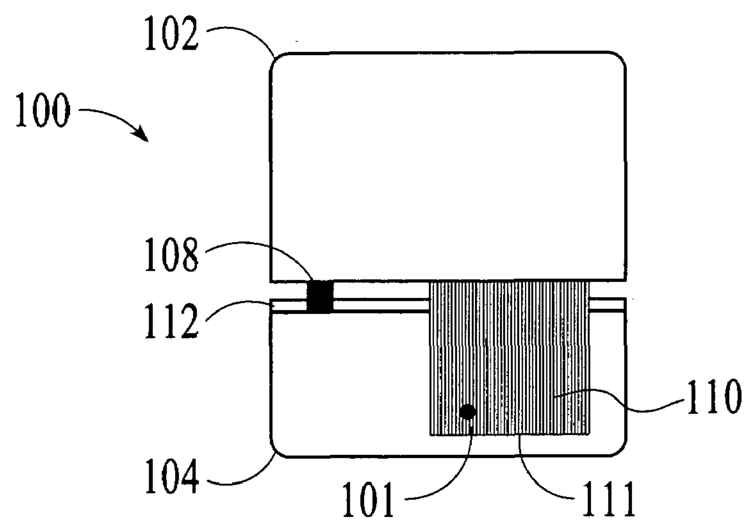
Figure 5:
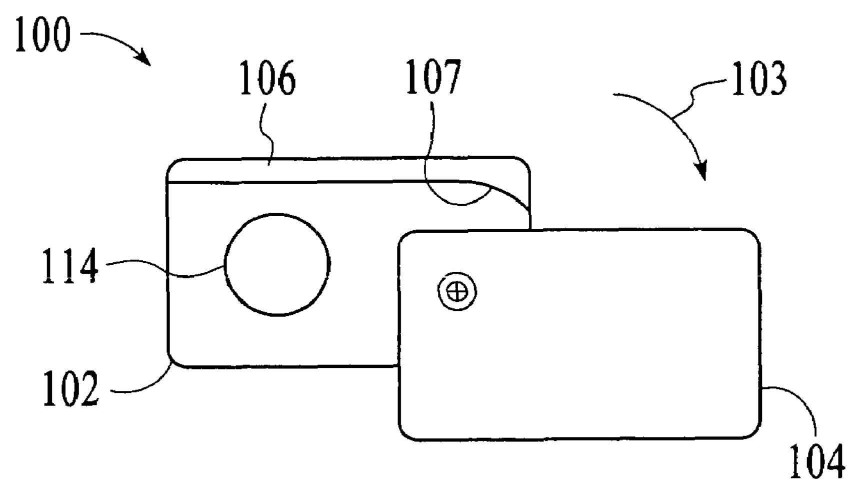
Figure 11A:
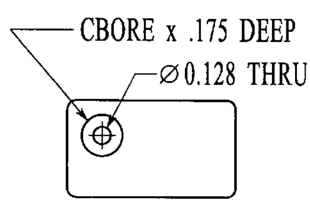
FIGS. 11 and 12 are dimensioned schematic diagrams of components of the apparatus of FIGS. 1–9 according to an embodiment.
Figure 11B:
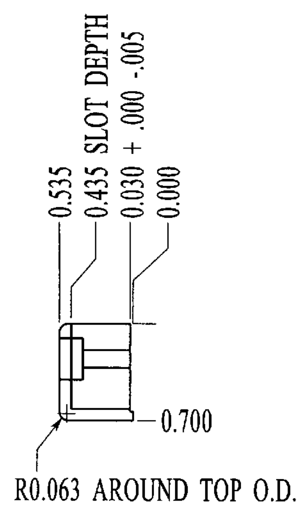
Figure 11C:
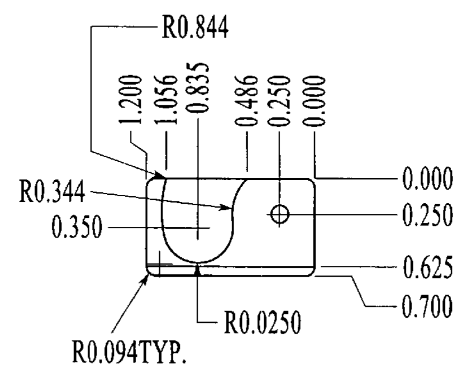
Figure 12A:
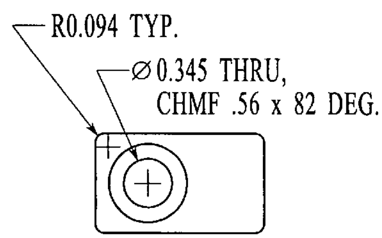
Figure 12B:
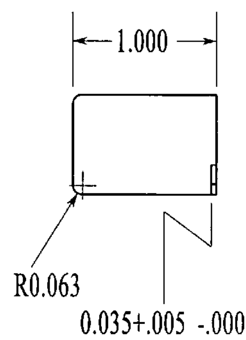
Figure 12C:
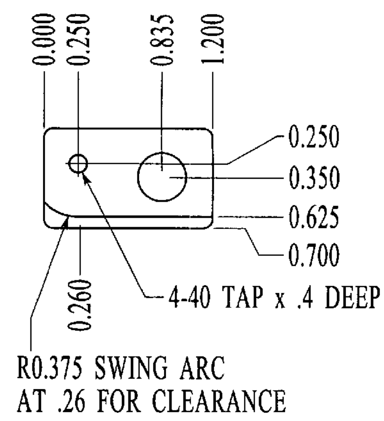

As shown in FIG. 1, the hair stacker apparatus 100 includes a top 102 and a bottom 104. The top 102 and the bottom 104 are coupled by a fastener 108, which is a screw in one embodiment. The top 102 is coupled to the bottom 104 such that a bottom surface of the top 102 is in proximity to a top surface of the bottom 104. Various embodiments also include a washer (not shown) on the fastener 108 between the top 102 and the bottom 104. The top 102 and the bottom 104 rotate with respect to one another about the fastener 108. The rotation of the top 102 and the bottom 104 with respect to one another is limited by protruding edges 106 and 112. The protruding edge 106 forms a lip that is located on the top 102 in proximity to the bottom surface of the top 102. The protruding edge 112 forms a lip that is located on the bottom 104 as shown in FIG. 3 in close proximity to a top surface of the bottom 104. The protruding edge 102 includes a swing arc 107 (as shown in FIGS. 5 and 11C) for clearance to accommodate rotation of the top 102 and the bottom 104 with respect to each other.

The separation of the top 102 and the bottom 104 is exaggerated in the figures for the purpose of illustrating features such as the protruding edges 106 and 112, which are not visible when the top 102 and the bottom 104 are more fully closed.

Figure 2:
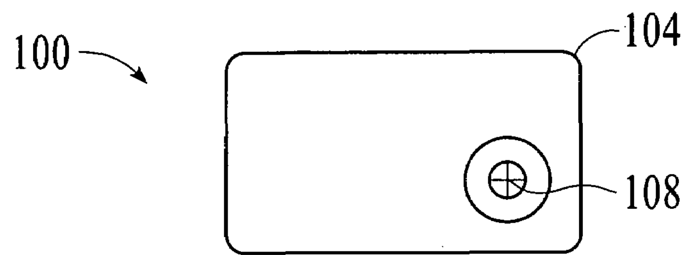

FIG. 2 is a diagram showing the bottom 104 and the top of fastener 108 sitting in a countersunk hole into which the fastener 108 is inserted for assembly of the top 102 to the bottom 104.

FIG. 3 is a diagram showing the side of the hair stacker apparatus 100 opposite the side shown in FIG. 1. The bottom 104 includes an area 110 for accommodating fibers or hairs. A bunch of fibers 101 is show inside the area. A protruding edge 112 limits the rotation of the top 102 with respect to the bottom 104 by coming into contact with the protruding edge 106 of the top 102. The separation of the top 102 and the bottom 104 is exaggerated in the figures for the purpose of illustrating features such as the protruding edges 106 and 112, which are not visible when the top 102 and the bottom 104 are more fully closed.

Figure 4:
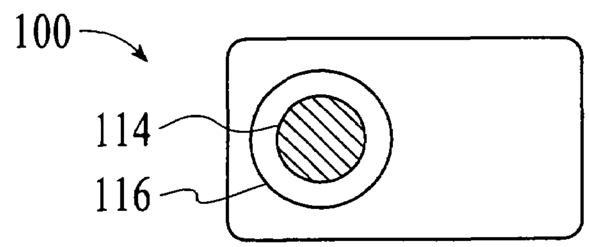

FIG. 4 is a diagram showing the top surface of the top 102 and an opening 114. In one embodiment the opening 114 is circular, and the inner diameter of the circle defines a through hole in the top 102. Hairs or other fibers 101 are inserted tip first into the opening 114. The tips of the hairs 101 are aligned by tapping the apparatus 100 to cause the tips of the hairs to rest on an alignment surface 111 of the area 110 (see FIG. 3). This "stacks" the hairs in a bunch with uniformly aligned tips in preparation for attaching the bunch to, for example, a fish hook. The opening 114 has a beveled edge, or chamfer 116 for easier insertion of hairs into the opening 114.

After the hairs are stacked as previously described, the apparatus 100 is opened to access the stacked hairs by rotating the top 102 and/or the bottom 104. FIGS. 5–9 are diagrams of an open apparatus 100. FIG. 5 is a diagram showing the bottom 104 rotated around the fastener 108 in the direction shown by arrow 103.

Figure 6:
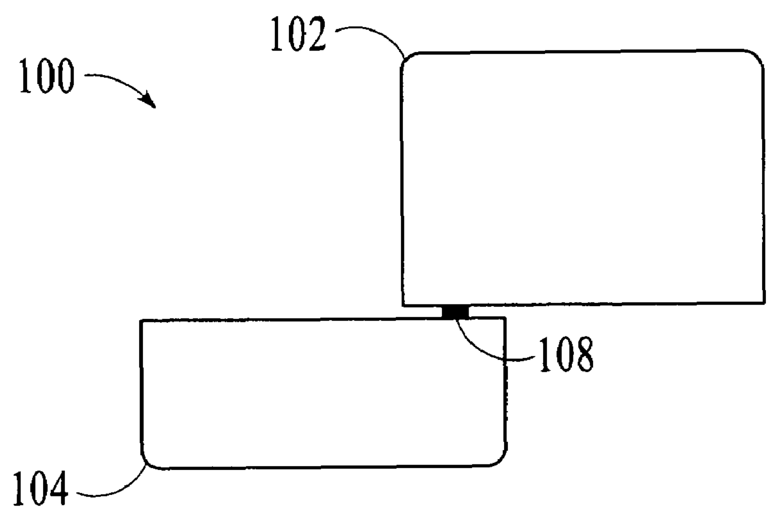

FIG. 6 is a diagram showing another view of the bottom 104 rotated to the same position with respect to the top 102 as shown in FIG. 5.

Figure 7:
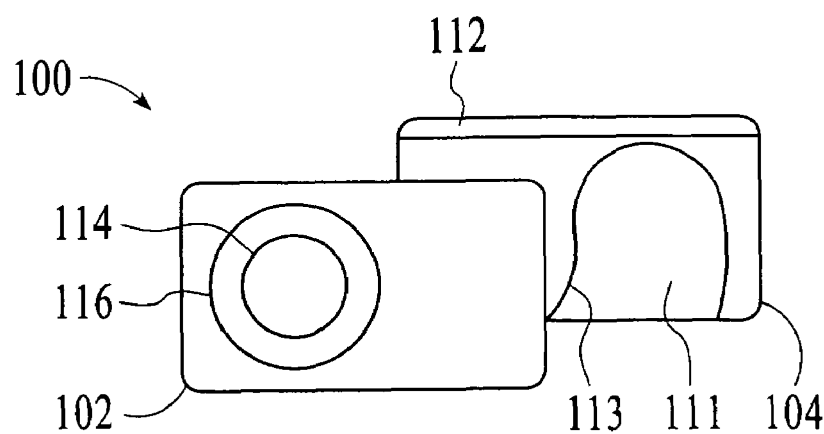

FIG. 7 is a diagram showing a different view of the apparatus 100 with the top 102 and the bottom 104 in the same relative positions as in FIGS. 5 and 6. FIG. 7 shows the opening 114 through which hairs are inserted, and also shows the surface 111 of the area 110 on which the tips of the hairs rest. The area 110 is defined by a curved wall 113 which, in a closed position of the apparatus 100, accommodates hairs or fibers inserted through the opening 114. In one embodiment, the opening 110 as defined by the curved wall 113 is larger than the through hole defined by the opening 114 in the top 102, and is aligned approximately coaxially with the through hole defined by the opening 114 in the top 102.

Figure 8:
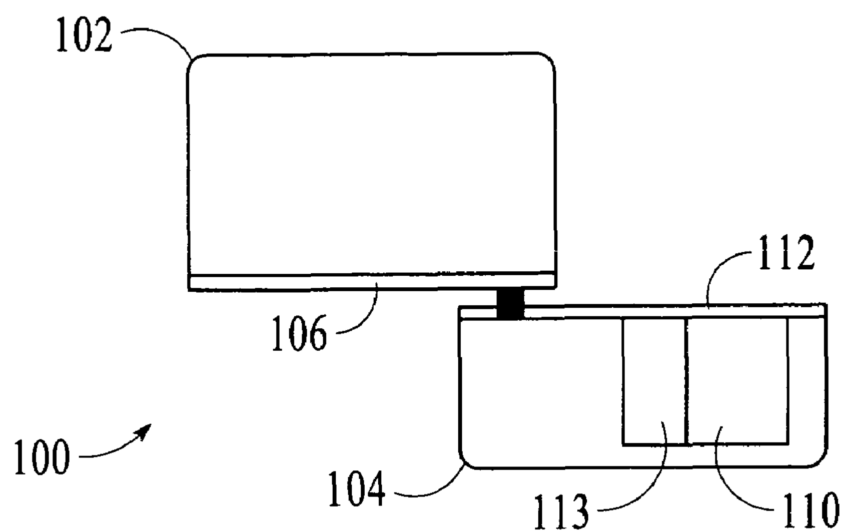

FIG. 8 is another view of the apparatus 100 with the top 102 and the bottom 104 in the same relative positions as in FIGS. 5 and 6. FIG. 8 shows a different view of the area 110 and the curved wall 113.

Figure 9:
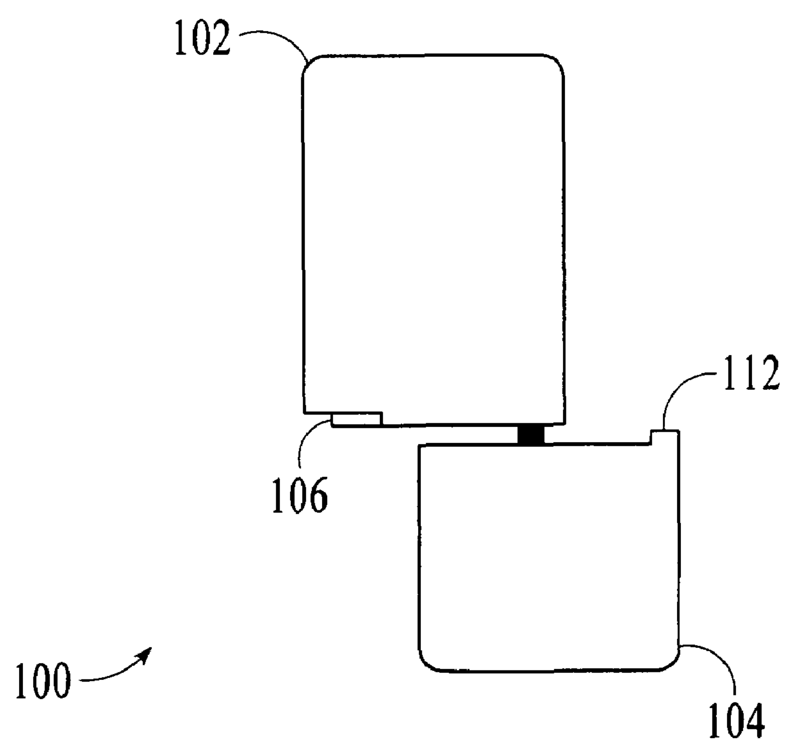

FIG. 9 is another view of the apparatus 100 with the top 102 and the bottom 104 in the same relative positions as in FIGS. 5 and 6. FIG. 9 shows the protruding edges 106 and 112 in cross-section in an open position of the apparatus 100. The edges 106 and 112 stop against each other in a closed position of the apparatus 100 and prevent rotation of either the top 102 or the bottom 104 in one direction.

Figure 10:
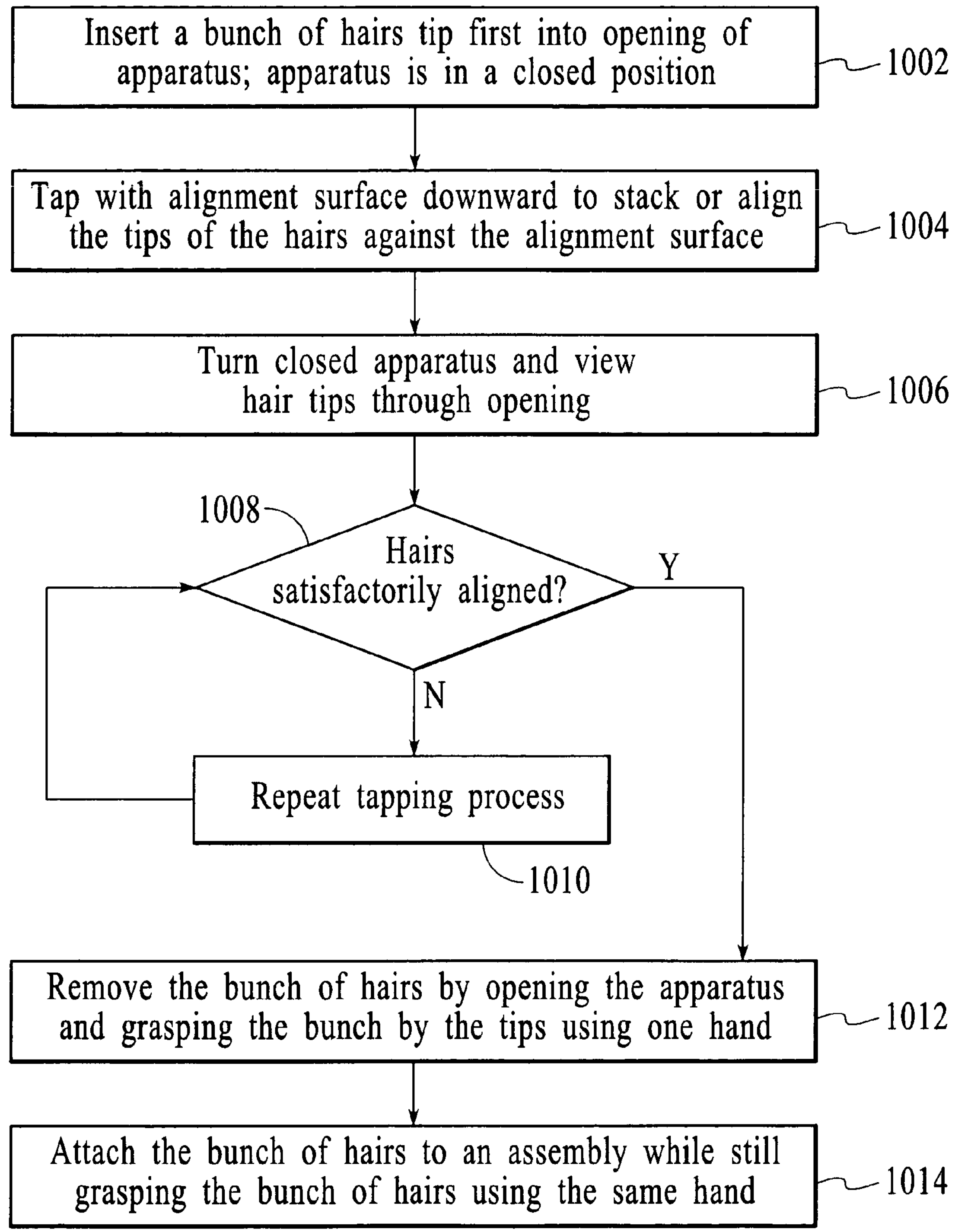
FIG. 10 is a flow diagram of a method for stacking hairs or fibers according to an embodiment using the apparatus of FIGS. 1–9.

FIG. 10 is a flow chart of a method 1000 of stacking or aligning hairs using embodiments of the apparatus as described herein. A bunch of hairs is inserted tip first into the opening of the top of the apparatus, when the apparatus is in a closed position, as shown at 1002. At 1004, the apparatus is tapped with the alignment surface downward to stack or align the tips of the hairs against the alignment surface. At 1006, the closed apparatus is turned to view the hair tips through the opening in the bottom 104. As shown at 1008, it can then be determined whether the hairs are satisfactorily aligned. That is, it can be determined whether all or almost all of the hairs tips are resting on the alignment surface. If the hairs are not satisfactorily aligned, the tapping Repeat tapping process is repeated at 1010.

The bunch of hairs is removed from the apparatus by opening the apparatus and grasping the bunch by the tips using one hand, as indicated at 1012. The apparatus is opened by rotating the top 102 or the bottom 104 such that the bottom 104 swings away from and exposes the aligned bunch of hairs. As shown at 1014, the bunch of hairs is then attached to an assembly while still being grasped using the same hand that removed the bunch from the apparatus.

If it is desired for some reason to grasp the root end of the bunch of hairs and leave the tip end free, this is also easily done by grasping the root end protruding from the opening 114 and removing the bunch of hairs. The apparatus 100 does not need to be opened in this case.

The apparatus 100 does not need to be disassembled in the normal course of use for stacking hairs or fibers. Therefore, there is never a danger of mislaying a part of the apparatus 100.

FIGS. 11A, 11B, 11C, 12A, 12B, and 12C are more detailed dimensioned diagrams of one embodiment of the invention, and are not intended to be limiting. Various dimensions and features other than those shown may also be used to make a hair or fiber stacker as described and claimed herein. Any suitable materials may be used to manufacture the apparatus, including but not limited to, plastic, aluminum, and other metals or alloys. The embodiments are described using hairs as an example of a fiber to be stacked, but any other fiber can be similarly stacked using the embodiments. The dimensions shown are an example of an embodiment that is suitable for stacking animal hairs for fishing flies, but embodiments are not so limited. For example, larger dimensions can be used to accommodate larger fibers. Also, the overall dimensions shown are comfortable for an average human hand to hold and manipulate. If it was desired to design an apparatus for unusually large or small hands, the dimensions can be adjusted accordingly. The invention is thus defined by the claims below.

What is claimed is:

1. A fiber stacking apparatus comprising:

a top component comprising a top surface and a bottom surface, wherein the top surface includes an opening therein configured to accommodate insertion of a plurality of fibers into the top component, wherein the opening defines a through hole through which the plurality of fibers can pass completely though the top component and out the bottom surface;

a bottom component comprising a top surface and a bottom surface, wherein the bottom component and the top component are coupled to each other with a coupling such that the bottom surface of the top component and the top surface of the bottom component are in proximity to each other, and such that the bottom component and the top component may rotate with respect to each other about an axis of rotation defined by the coupling, wherein the bottom component comprises, an opening in the top surface of the bottom component that is approximately aligned with the through hole when the top component and the bottom component are rotated with respect to each other to a closed position;

a curved wall of the opening that defines an area sized to accommodate the plurality of fibers that is passed through the through hole of the top component, wherein the curved wall extends from a first point on a side surface of the bottom component and around the area to a second point on the side surface, wherein the side surface is orthogonal to the top surface of the bottom component, such that an opening is defined in the side surface that allows the bottom component to be rotated about the axis of rotation away from the closed position in a direction that rotates the bottom component away from the plurality of fibers to expose the plurality of fibers without disturbing the plurality of fibers; and an alignment surface parallel to the top surface of the bottom component, wherein a circumference of the alignment surface is defined by the curved wall and the side surface, and wherein the alignment surface provides a limit of travel for the plurality of fibers that is inserted through the through hole and into the area.

2. The apparatus of claim 1, wherein the coupling comprises a rod-shaped fastener that is inserted into the top component and the bottom component at the axis of rotation so as to provide a hinge about which the top component and the bottom component rotate.

3. The apparatus of claim 1, wherein the top component comprises a protruding edge, wherein the protruding edge forms a lip that is an extension of a side surface of the top component, wherein the side surface is orthogonal to the bottom surface of the top component, wherein the protruding edge comes into contact with the bottom component so as to limit rotation of the top component with respect to the bottom component.

4. The apparatus of claim 3 wherein the protruding edge of the top component comprises a swing arc to accommodate rotation of the top component and the bottom component with respect to each other.

5. The apparatus of claim 1, wherein the bottom component comprises a protruding edge, wherein the protruding edge forms a lip that is an extension of the side surface of the bottom component, wherein the side surface is orthogonal to the top surface of the bottom component, wherein the protruding edge comes into contact with the tap component so as to limit rotation of the top component with respect to the bottom component.

6. The apparatus of claim 1, wherein:

the top component comprises a protruding edge, wherein the protruding edge forms a lip that is an extension of a side surface of the top component, wherein the side surface is orthogonal to the bottom surface of the top component, wherein the protruding edge comes into contact with the bottom component so as to limit rotation of the top component with respect to the bottom component, and wherein the bottom component comprises a protruding edge, wherein the protruding edge forms a lip that is an extension of the side surface of the bottom component wherein the side surface is orthogonal to the top surface of the bottom component, wherein the protruding edge comes into contact with the top component so as to limit rotation of the top component with respect to the bottom component, and wherein limitation of the rotation comprises limiting rotation of the bottom component from the closed position in a direction that rotates the bottom component toward the plurality of fibers.

7. The apparatus of claim 1, wherein the through hole is 0.250 inches to 0.400 inches in diameter.

8. The apparatus of claim 7, wherein the area in the bottom component has a diameter equal to or greater than the diameter of the through hole.

9. The apparatus of claim 1, wherein the opening that defines the through hole comprise a chamfer about the opening that is at a constant angle with respect to the plane of the top surface of the top component.

10. A method for stacking fibers, the method comprising:

inserting a plurality of fibers into an opening in an apparatus, wherein the apparatus is in a closed position, wherein the plurality of fibers is approximately longitudinally oriented, and wherein all of the hairs are oriented so as that a first end is inserted into the opening;

tapping the apparatus with an alignment surface downward such that the first ends of the plurality of fibers rests against the aligrunent surface so as to align the plurality of fibers;

turning the closed apparatus so as to view the first ends of plurality of fibers through an opening in a side of the apparatus; and opening the apparatus by rotating a rotatably coupled portion of the apparatus with respect to the apparatus such that the first ends of the aligned plurality of fibers are exposed.

11. The method of claim 10, further comprising:

when viewing the first ends of the plurality of fibers, determining whether the first ends of the plurality of fibers rest against the alignment surface so as to be aligned;

if the plurality of fibers is not aligned, turning the closed apparatus such that the alignment surface is downward; and tapping the apparatus again.

12. The method of claim 10, farther comprising:

grasping the aligned plurality of fibers; and removing the aligned plurality of fibers.

13. A fiber aligning apparatus, comprising:

a first component configured to permit the introduction of a plurality of fibers into an opening that defines a through hole through the first component; and a second component rotatably coupled to the first component, wherein the second component is configured to permit the introduction of the plurality of fibers that have passed through the through hole into an area in the second component that includes an alignment surface which limits the travel of the plurality of fibers so as to align the plurality of fibers, wherein the second component is further configured to be rotated away from the aligned plurality of fibers to expose the aligned plurality of fibers without disturbing them.

14. The apparatus of claim 13, wherein the first component and the second component are coupled with a bottom surface of the first component and a top surface of the second component in parallel to each other and in proximity to each other, and wherein the alignment surface is parallel to the top surface of the bottom component.

15. The apparatus of claim 14, wherein the alignment surface is defined by a wall that is orthogonal to the alignment surface.

16. The apparatus of claim 15, wherein the wall extends from a first point on a side of the second component, around an outer circumference of the alignment surface, and to a second point on the side of the second component, wherein the side is orthogonal to the top surface of the second component.

17. The apparatus of claim 16, wherein the first point and the second point define an opening in the side of the second component through which the plurality of fiber can be viewed with the apparatus in a closed position, wherein in the closed position the through hole and the area in the second component are aligned so as to allow passage of the plurality of fibers through the through hole and into the area.

18. The apparatus of claim 17, wherein the area defined by the curved wall is approximately circular so as to retain the plurality of fibers in an approximately circular bunch.

* * * * *